(12) United States Patent
Diatzikis et al.

(10) Patent No.: US 8,687,175 B2
(45) Date of Patent: Apr. 1, 2014

(54) FLUID FLOW VELOCITY AND TEMPERATURE MEASUREMENT

(75) Inventors: Evangelos V. Diatzikis, Chuluota, FL (US); Edward D. Thompson, Casselberry, FL (US); Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 267 days.

(21) Appl. No.: 13/101,350

(22) Filed: May 5, 2011

(65) Prior Publication Data
US 2012/0279313 A1    Nov. 8, 2012

(51) Int. Cl.
*G01F 1/28* (2006.01)
*G02B 6/43* (2006.01)

(52) U.S. Cl.
USPC .................. 356/27; 73/861.72; 385/13

(58) Field of Classification Search
CPC ............. G01F 1/28; G01F 1/383; G01F 1/40
USPC .............................. 356/27, 28, 385
See application file for complete search history.

(56) References Cited

U.S. PATENT DOCUMENTS

| | | | |
|---|---|---|---|
| 3,702,561 A | 11/1972 | Carson et al. | |
| 3,995,180 A | 11/1976 | Giles | |
| 4,488,072 A | 12/1984 | Archibald et al. | |
| 4,531,070 A | 7/1985 | Kuhn | |
| 5,325,725 A | 7/1994 | Sanderson et al. | |
| 5,492,004 A | 2/1996 | Berg et al. | |
| 6,765,194 B2 | 7/2004 | Holz et al. | |
| 6,807,325 B1 | 10/2004 | Kraemmer et al. | |
| 7,004,038 B2 * | 2/2006 | Tsai | 73/861.71 |
| 7,379,632 B1 | 5/2008 | Twerdochlib | |
| 7,400,789 B2 * | 7/2008 | Xia et al. | 385/12 |
| 7,502,538 B2 | 3/2009 | Brummel et al. | |
| 7,672,545 B2 | 3/2010 | Vincelette | |
| 2004/0237648 A1 | 12/2004 | Joens et al. | |
| 2005/0163424 A1 | 7/2005 | Chen | |
| 2007/0063859 A1 * | 3/2007 | Twerdochlib et al. | 340/679 |
| 2008/0036336 A1 | 2/2008 | Salem et al. | |
| 2008/0247702 A1 | 10/2008 | Thompson et al. | |
| 2010/0066315 A1 * | 3/2010 | Diatzikis et al. | 322/99 |
| 2010/0142880 A1 | 6/2010 | Erdmenger et al. | |

FOREIGN PATENT DOCUMENTS

DE   102010016837 A1   1/2011
WO     2011039169 A1   4/2011

* cited by examiner

*Primary Examiner* — Gregory J Toatley
*Assistant Examiner* — Maurice Smith (57) ABSTRACT

A method is provided for monitoring velocity of a fluid flow through a predetermined fluid flow space. A fiber optic conductor includes a flow measurement portion defining an elongated dimension extending across a portion of the fluid flow space. The fluid flow in the fluid flow space causes the measurement portion of the fiber optic conductor to flex in a direction transverse to the elongated dimension. Optical radiation is supplied to the fiber optic conductor, and optical radiation is received from the fiber optic conductor after the supplied optical radiation has passed through the measurement portion. The received optical radiation is analyzed to effect a determination of a flow velocity of the fluid flow.

9 Claims, 6 Drawing Sheets

FLUID FLOW VELOCITY AND TEMPERATURE MEASUREMENT

FIELD OF THE INVENTION

The present invention relates generally to measurement of fluid flow velocity and, more particularly, to a method and system using optical radiation to measure flow velocities.

BACKGROUND OF THE INVENTION

An electrical generator used in the field of electrical power generation includes a stator winding having a large number of conductor or stator bars that are pressed into slots in a base body, in particular, a laminated stator core or a rotor body. Such an electrical generator represents a very expensive and long-term investment. Its failure not only endangers the power equipment itself but may also result in very severe service reduction due to the down time associated with repair. To avoid such a condition, a diagnostic system may be used for early identification of defects or deterioration in operation. The diagnostic system may further allow a higher utilization level, making the power equipment more financially viable.

For example, in an electrical generator, hydrogen or air may typically be used as a cooling medium for parts of the generator such as the stator core and the end winding region, and additionally may be used to cool the stator coils and the rotor. Ventilation for proper cooling of the generator components is built into the design and generally may be essential to the continued safe operation of the electrical generator. It has been observed that many problems resulting in generator failure and costly power plant outages may be traced to inadequate ventilation, i.e., ventilation not being provided in accordance with design conditions. In particular, unintended flow modification of the cooling flow may be caused by parts that come loose during generator operation, mislocated baffles, leaking seal strips, and dislodged and migrating insulation filler strips, which may result in overheating of parts and insulation failure.

Existing monitoring systems include monitoring temperature as an indication of a condition of select locations within an electrical generator. However, such temperature monitoring may not provide information on the cause of temperature variations, such as causes relating to unintended flow modification of ventilation flow through the generator.

SUMMARY OF THE INVENTION

In accordance with an aspect of the invention, a method is provided for monitoring velocity of a fluid flow through a predetermined fluid flow space. The method comprises supporting a fiber optic conductor having a flow measurement portion defining an elongated dimension extending across a portion of the fluid flow space. The fluid flow in the fluid flow space causes the measurement portion of the fiber optic conductor to flex in a direction transverse to the elongated dimension. Optical radiation is supplied to the fiber optic conductor, and optical radiation is received from the fiber optic conductor after the supplied optical radiation has passed through at least a portion of the measurement portion. The received optical radiation is analyzed to effect a determination of a flow velocity of the fluid flow.

In accordance with additional aspects of the invention, the flow measurement portion of the fiber optic conductor may include a Bragg grating having a characteristic optical wavelength, and the Bragg grating may interact with the supplied optical radiation to form the received optical radiation. A strain produced within the measurement portion of the fiber optic conductor may produce a reflected wavelength, and a change in the received optical radiation results from a shift in wavelength from the characteristic wavelength corresponding to a flow velocity at the measurement portion.

In accordance with additional alternative aspects of the invention, the flow measurement portion of the fiber optic conductor may include a long period grating (LPG) structure, and the LPG structure may effect a change in the supplied optical radiation to form the received optical radiation including cladding modes characteristic of an amount of flexing of the fiber optic conductor corresponding to the flow velocity of the fluid flow. A plurality of fiber optic conductors may be provided, each fiber optic conductor having a base end supported on a base structure and a free end located in the fluid flow, each fiber being free to bend in the fluid flow and having an LPG structure and each LPG structure having a set of cladding modes characteristic of the bending of a respective fiber optic conductor. The received optical radiation may comprise optical radiation reflected off ends of the fiber optic conductors distal from the base end.

In accordance with a further aspect of the invention, a system is provided for monitoring velocity of a fluid flow through a predetermined fluid flow space. The system including a conduit structure comprising a hollow member extending in a loop to define a generally circular passage. A fiber optic conductor extends within the conduit structure, and the fiber optic conductor defines a flow measurement portion including a Bragg grating extending outside of the conduit structure across a portion of the fluid flow space within the generally circular passage. An optical radiation source is provided for supplying optical radiation to the fiber optic conductor, and a processing unit is adapted to receive and analyze optical radiation from the fiber optic conductor after the supplied optical radiation has passed through the measurement portion to effect a determination of a flow velocity of the fluid flow.

Further, a second fiber optic conductor may be provided connected to the optical radiation source and the processing unit and extending within the conduit structure, the second fiber optic conductor being fully contained within the conduit structure and including one or more Bragg gratings adapted to provide a temperature measurement at locations of the one or more Bragg gratings.

In accordance with another aspect of the invention, a system is provided for monitoring velocity of a fluid flow through a predetermined fluid flow space. The system comprises a base and a fiber optic conductor including a base end supported on the base. The fiber optic conductor defines a flow measurement portion including a long period grating (LPG) structure extending across a portion of the fluid flow space. An optical radiation source is provided supplying optical radiation to the fiber optic conductor, and a processing unit is provided adapted to receive and analyze optical radiation from the fiber optic conductor after the supplied optical radiation has passed through the measurement portion to effect a determination of a flow velocity of the fluid flow with reference to cladding modes formed by the LPG structure. In accordance with additional aspects of the invention, a plurality of the fiber optic conductors may be supported on the base, each including a LPG structure, and including a supply fiber optic conductor extending from the optical radiation source and a splitter providing optical radiation from the supply fiber optic conductor to each of the fiber optic conductors.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Various locations in an electrical generator may benefit from determining flow and temperature characteristics of cooling fluid, e.g., hydrogen or air, passing through the interior of the generator. For example, an outlet of a blower providing cooling fluid to a generator may be monitored to sense flow velocities and temperatures of the cooling fluid passing through the outlet to determine that the flow and temperature profiles match design profiles for this area. Specifically, in accordance with aspects of the measurement system described herein, it may be desirable to monitor changes in one or both of the flow velocity and temperature over time at various locations around the blower outlet as a means of identifying a change in the blower structure that may predict a potentially damaging condition. Exemplary conditions that may occur in the region of the blower outlet include loosening blower shroud mounting hardware or damaged blower vanes provided for channeling the cooling fluid passing into the generator. It is believed to be desirable to detect these conditions in that if these components or parts of these components should come loose and pass into the generator, catastrophic mechanical and/or electrical damage to the generator may occur. It should be understood that, while aspects of the present monitoring system are described with particular reference to a blower outlet duct for a generator, the system may be implemented in other locations of the generator, as well as in applications other than those comprising a generator.

Figure 1:
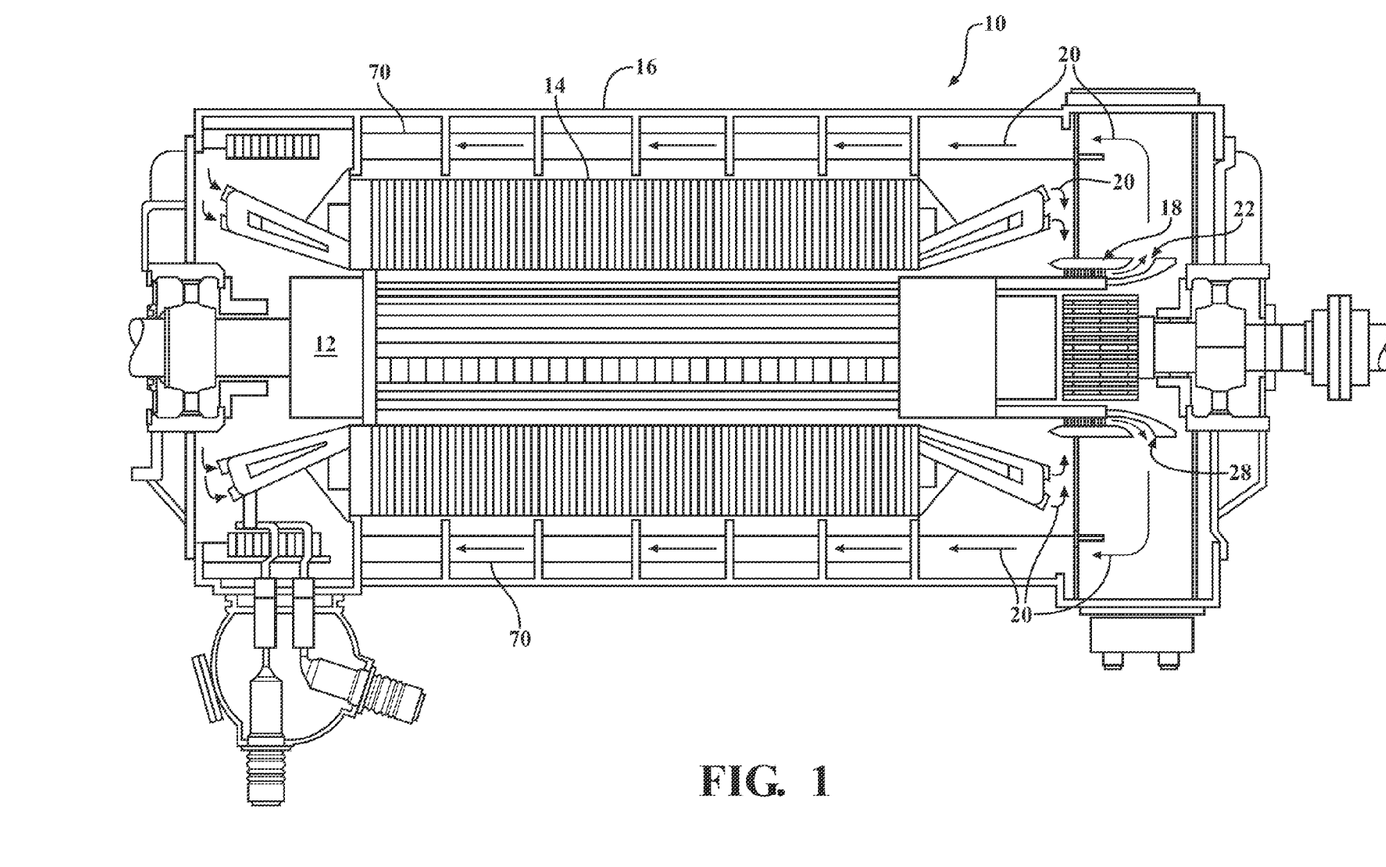
FIG. 1 is a cross-sectional view of an electrical generator incorporating a monitoring structure of the present invention.

Referring to FIG. 1, an electrical generator 10 is illustrated including a rotor 12 and a stator 14 enclosed by a generator frame or housing 16. The rotor 12 may typically include a blower 18 for propelling cooling fluid, e.g., hydrogen, around the interior of the generator 10 to promote cooling, as indicated by the directed line segments 20 illustrating flow patterns for the cooling fluid. The blower 18 may discharge the cooling fluid through a generally annular outlet duct 22, defining a fluid flow space 27 between an inner wall 24 and an outer wall 26, see FIG. 2. In accordance with an aspect of the invention, flow from the outlet duct 22 may be monitored to ensure that it is provided in accordance with predetermined design requirements to provide a desired level of cooling within the generator 10. In particular, locations around the outlet duct 22 may be monitored to ensure that the flow and temperature for the cooling fluid exiting the outlet duct are at predetermined levels.

Figure 2:
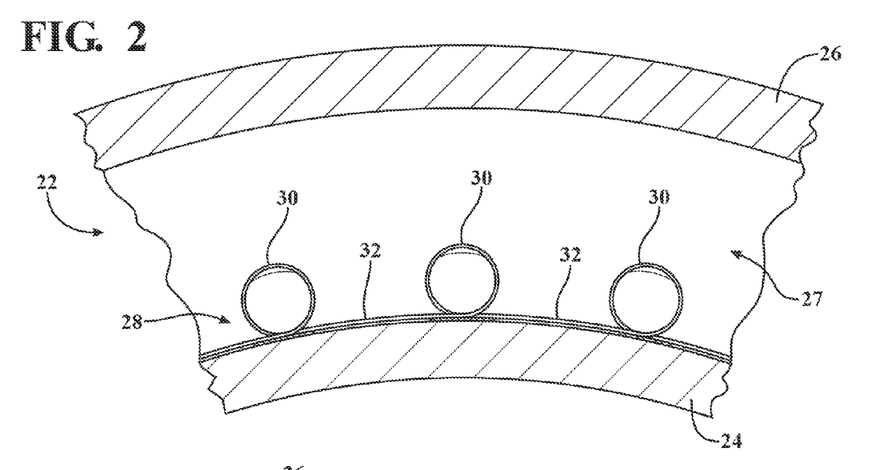
FIG. 2 is a diagrammatic cross-sectional view of a portion of a generator blower outlet including the monitoring structure of the present invention.

Referring to FIG. 2, a portion of the outlet duct 22 for generator 10 is illustrated diagrammatically, including a monitoring structure 28 in accordance with an aspect of the present system. The monitoring structure 28 includes a plurality of detection units 30 circumferentially spaced around the circumference of the outlet duct 22. Each detection unit 30 is preferably configured to provide a flow velocity and temperature measurement for a location in the duct 22 corresponding to the location of a respective detection unit 30.

Figure 3:
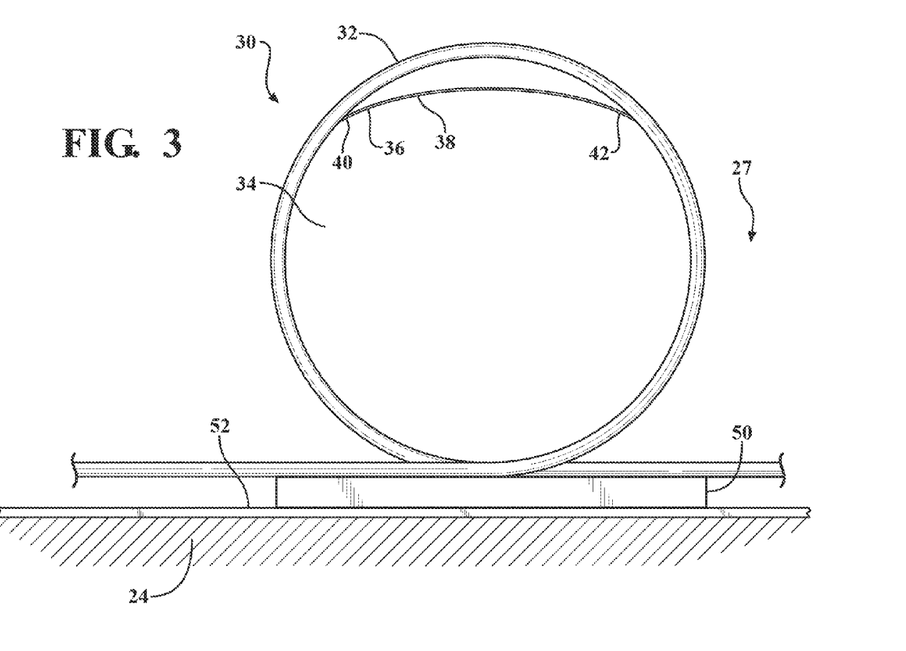
FIG. 3 is an enlarged view of a detection unit for the monitoring structure.
Figure 4:
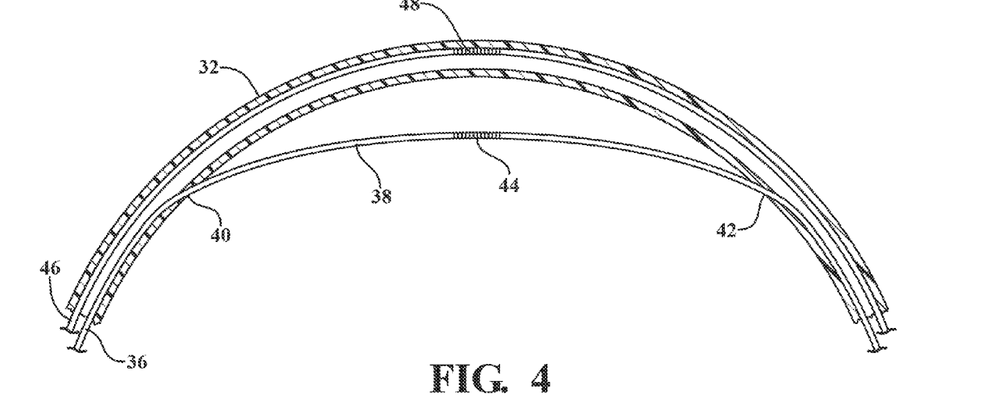
FIG. 4 is an enlarged view of a section of the detection unit of FIG. 3 including a measurement portion.

Referring to FIGS. 3 and 4, the detection units 30 each include a conduit structure 32 comprising a hollow member extending in a loop to define a generally circular passage 34 for passage of cooling fluid flow. The loop of the conduit structure 32 may be small in relation to size of the outlet duct 22.

A first fiber optic conductor 36 extends within and is at least partially enclosed in the conduit structure 32 to protect the fiber optic conductor 36, and to position the fiber optic conductor 36 at a predetermined location within the fluid flow space 27. The fiber optic conductor 36 defines an elongated flow measurement portion 38 extending outside of the conduit structure 32 across a portion of the fluid flow space 27 within the circular passage 34. In particular, the fiber optic conductor 36 extends between a first location defined by a first opening 40 on the conduit structure 32 and a second location defined by a second opening 42 on the conduit structure 32. Hence, the measurement portion 38 is defined by a portion of the fiber optic conductor 36 supported in stationary relation to the conduit structure 32 at the first and second openings 40, 42, and extending through a portion of the fluid flow space 27 for contact with cooling fluid passing through the outlet duct 22. The measurement portion 38 includes at least one velocity fiber Bragg grating (FBG) 44, illustrated in FIG. 4 as centrally located between the first and second openings 40, 42.

The detection unit 30 may further include a second fiber optic conductor 46 that extends within and is substantially enclosed in the conduit structure 32. The second fiber optic conductor 46 may extend in side-by-side relation with the first fiber optic conductor 36 through the conduit structure 32. The second fiber optic conductor 46 includes at least one temperature FBG 48 located within the conduit structure 32 at a location generally midway between the first and second openings 40, 42. However, it should be understood that the temperature FBG 48 may be located at other locations along or adjacent to the loop defined by the conduit structure 32.

It should be noted that the temperature FBGs 48 are similar in structure and operate in a similar way to the velocity FBGs 44, in that the temperature FBGs 48 provide a measurement of strain, as produced by a change in temperature. In addition, the temperature FGBs 48 may be formed in the first fiber optic conductor 36 at one or more locations within the conduit structure 32. As is discussed below, each of the FBGs 44, 48 is formed with a unique central Bragg wavelength, such that the particular source or sensor producing a signal may be identified by wavelengths at or near the unique wavelength for the sensor.

The detection unit 30 may be substantially rigidly affixed on a base portion 50 (FIG. 3) to support the detection unit 30 in stationary relation to an inner surface 52 of the inner wall 24, with a plane defined by the loop of the conduit structure 32 extending perpendicular to the inner wall 24 and extending transverse to the fluid flow direction. The base portion 50 may comprise a small pad provided to each of the detection units 30 for mounting the detection units 30 to the inner surface 52, such as by an adhesive or mechanical attachment. Alternatively, the base portion 50 may comprise a continuous base around the circumference of the inner wall 24, and may comprise a material of sufficient flexibility to form a flexible mat structure with the detection units 30 attached thereto for extending around a curved surface, such as the inner wall 24, or to extend around irregularly contoured surfaces. The base portion 50 provides a support for the detection units 30 that permits movement of the underlying surface 52, such as thermal expansion or contraction, without transferring such movement to the optical fiber conduits 36, 46. The base may be formed of any material capable of operating in the environment in which the monitoring structure 28 is placed and capable of isolating the detection units from movement. For example and without limitation, the base material may comprise metal or plastic ribbon or, in some applications, a Velco® strip.

The fiber optic conductors 36, 46 are preferably formed of an elastically deformable material such as is typically used in FBG sensors. In particular, the fiber optic conductors 36, 46 may comprise a small inner glass core having an outer glass cladding with a different index of refraction than the inner core. The Bragg grating comprises lines of slightly different index of refraction placed in the inner core using ultraviolet light. The fiber optic conductors 36, 46 do not include an outer plastic jacket, such that the diameter of the fiber is very small. In addition, although the FBGs 44, 48 are illustrated diagrammatically herein as lines located on the fiber optic conductors 36, 46, it may be understood that the FBGs 44, 48 are not typically visible on the fiber optic conductors 36, 46. The conduit structure 32 may comprise a capillary tube structure formed of a material having greater rigidity than the material of the fiber optic conductors 36, 46. For example, the conduit structure 32 is preferably a dielectric material, such as a plastic or composite material, that is sufficiently stiff to resist movement when subjected to forces exerted by the cooling fluid flow. However, the conduit structure 32 may be sufficiently flexible to generally follow varying contours of structure on which the detection units 30 are supported. For example, the conduit structure may be formed of a copper-nickel capillary that may be on the order of 0.10 inch in diameter.

Each one of the first and second fiber optic conductors 36, 46 is a continuous conductor extending within a continuous conduit structure 32 through each of the detection units 30. The first fiber optic conductor 36 includes a plurality of velocity FBGs 44, i.e., at least one velocity FBG 44 per detection unit 30, and each velocity FBG 44 has a grating spacing that corresponds to a unique central Bragg wavelength λ, for reflecting light at a wavelength that is unique to each FBG 44 in the first fiber optic conductor 36. Similarly, the second fiber optic conductor 46 includes a plurality of temperature FBGs 48, i.e., at least one temperature FBG 48 per detection unit 30, and each temperature FBG 48 has a grating spacing that corresponds to a unique central Bragg wavelength λ, for reflecting light at a wavelength that is unique to each FBG 48 in the second fiber optic conductor 46.

Figure 5:
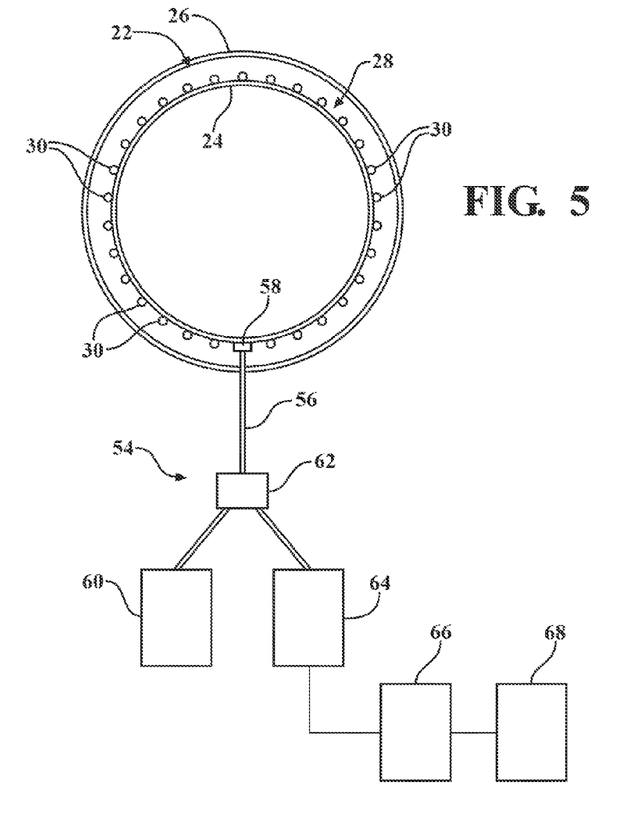
FIG. 5 is a diagrammatic view of a monitoring system including the monitoring structure.

Referring to FIG. 5, a monitoring system 54 including the monitoring structure 28 is illustrated. The monitoring system 54 includes a fiber optic conductor structure 56 which may comprise a continuation of the conduit structure 32 and enclosed fiber optic conductors 36, 46 or, alternatively, may comprise a common fiber optic conductor branching from a connector or junction 58 with the fiber optic conductors 36, 46 for carrying the light signals from both of the fiber optic conductors 36, 46. The monitoring system 54 may further include a source of optical radiation 60, such as a broadband light source, coupled to the fiber optic conductor structure 56 at a coupler 62 for providing the monitoring structure 28 with optical radiation, and which provides a predetermined range of light wavelength (frequency) to correspond to the central Bragg wavelength λ of any FBGs 44, 48 located along the fiber optic conductors 36, 46. Reflected light from the FBGs 44, 48 is transmitted back through the fiber optic conductor structure 56 and is received via the coupler 62 at an optical processor or analyzer 64. The data processed by the analyzer 64 may further be communicated to an operator interface such as a monitor 66 and/or to a data acquisition system 68.

In a measurement operation performed by the monitoring system 54, a cooling fluid flow passing through the outlet duct 22 passes around the plurality of detection units 30, including flow through the passages 34 defined within the loops of the conduit structure 32. As the cooling fluid passes through the passages 34, fluid flow may cause the measurement portion 38 of the first fiber optic conductor 36 to flex in a direction that is transverse to the elongated dimension of the measurement portion 38, i.e., generally perpendicular or transverse to the plane of the loop of the conduit structure 32. The flexing of the measurement portions 38 produces a strain in the first fiber optic conductor 36 at the velocity FBGs 44 that is proportional to the velocity of the fluid flow passing across the measurement portions 38 containing the respective velocity FBGs 44. The flexing, and resulting strain, at the velocity FBGs 44 causes the spacing between the gratings forming the velocity FBGs 44 to change with a resulting change in a wavelength of light supplied from the source of optical radiation 60 and reflected from the velocity FBGs 44 to provide a velocity measurement for each velocity FBG 44, as may be determined by the analyzer 64. Since the velocity FBGs 44 will always sense the air flow in a flexed state, the reflected wavelength from each velocity FBG 44 will be equal to or greater than the unique central Bragg wavelength λ of the respective velocity FBG 44.

In addition, the temperature at the locations of the temperature FBGs 48 may cause the second fiber optic conductor 46 to expand and contract an amount that is proportional to the temperature of the fluid flow. The expansion or contraction of the second fiber optic conductor 46 causes a spacing between the gratings forming the temperature FBGs 48 to change with a resulting change in a wavelength of light supplied from the source of optical radiation 60 and reflected from the temperature FBGs 48 to provide a temperature measurement for each temperature FBG 48, as may be determined by the analyzer 64. A variation of the reflected wavelength for each temperature FBG 48 may be centered around the unique central Bragg wavelength λ of the respective temperature FBG 48.

In addition to providing a temperature measurement at the locations of the detection units 30 for monitoring the proper operation of the cooling fluid passing through the generator 10, the temperature FBGs 48 provide a temperature correction value for correcting the velocity measurements of the velocity FBGs 44 with variations in the temperature of the cooling fluid. Specifically, the measurement portion 38 of the first fiber optic conductor 36 may expand and contract with variations in temperature, such that the reflected wavelength from the velocity FBGs 44 may include a temperature component associated with a temperature change as well as a velocity component associated with flexure of the measurement portion 38 resulting from the flow velocity. The shift in reflected wavelength of the velocity FBGs 44 of the first fiber optic conductor 36 that occurs with changes in temperature may be compensated using the measured shift in wavelength at the temperature FBG 48. That is, the change in wavelength measured by the temperature FBG 48 may be used to subtract out the temperature component of the change in reflected wavelength from the central Bragg wavelength λ provided by the velocity FBG 44, such that only the velocity component of the measurement from the velocity FBG 44 remains.

In accordance with an aspect of the invention, the velocity and temperature at the location of each detection unit 30 may be determined. The data from the known locations for the plurality of detection units 30 may be indicative of the condition of the cooling system for the generator 10. A variation of either a flow velocity from a predetermined flow velocity or a temperature from a predetermined temperature in each of the locations of the detection units 30 may indicate a variation in flow from design conditions, such as may be caused by a loose or displaced component within the generator. Hence, in addition to providing a monitoring that may provide an indication of improper cooling provided within the generator 10, the monitoring system 54 may provide an advance indication of a loose or displaced component, potentially enabling implementation of a repair or maintenance operation prior to loose parts traveling to critical parts of the generator where they may cause catastrophic damage.

It may be noted that a large number of the detection units 30 may be provided, including providing on the order of one-hundred velocity FBGs 44 in the first fiber optic conductor 36, and an equal number of temperature FBGs in the second fiber optic conductor 46. Further, it should be understood that more than one velocity FBG 44 and temperature FBG 48 may be provided to each of the detection units 30.

Although the described embodiment incorporates all of the velocity FBGs 44 into the first fiber optic conductor 36 and all of the temperature FBGs 48 into the second fiber optic conductor 46, it should be understood that additional fiber optic conductors may be provided. For example, to ensure that sensing capability is maintained in the event that a break occurs in either of the first and second fiber optic conductors 36, 46, the velocity and temperature FBGs 44, 48 may be formed in a plurality of respective first and second fiber optic conductors 36, 46 that may extend from the junction 58 (FIG. 5). Hence, light may be supplied to and reflected from the velocity and temperature FBGs 44, 48 along a plurality of paths to ensure continuity of the monitoring operation in the event that one of the first and second fiber optic conductors 36, 46 is damaged.

It should be understood that, although the present structure is described with reference to attachment to the inner wall 24 of the outlet duct 22, the detection units 30 described herein may be positioned on the outer wall 26, or on any other surface within the generator 10 where it is desired to monitor a fluid flow velocity and a temperature. Further, the monitoring structure 28 may be incorporated in other machines than a generator such as, for example, within a compressor for a gas turbine engine.

Figure 6:
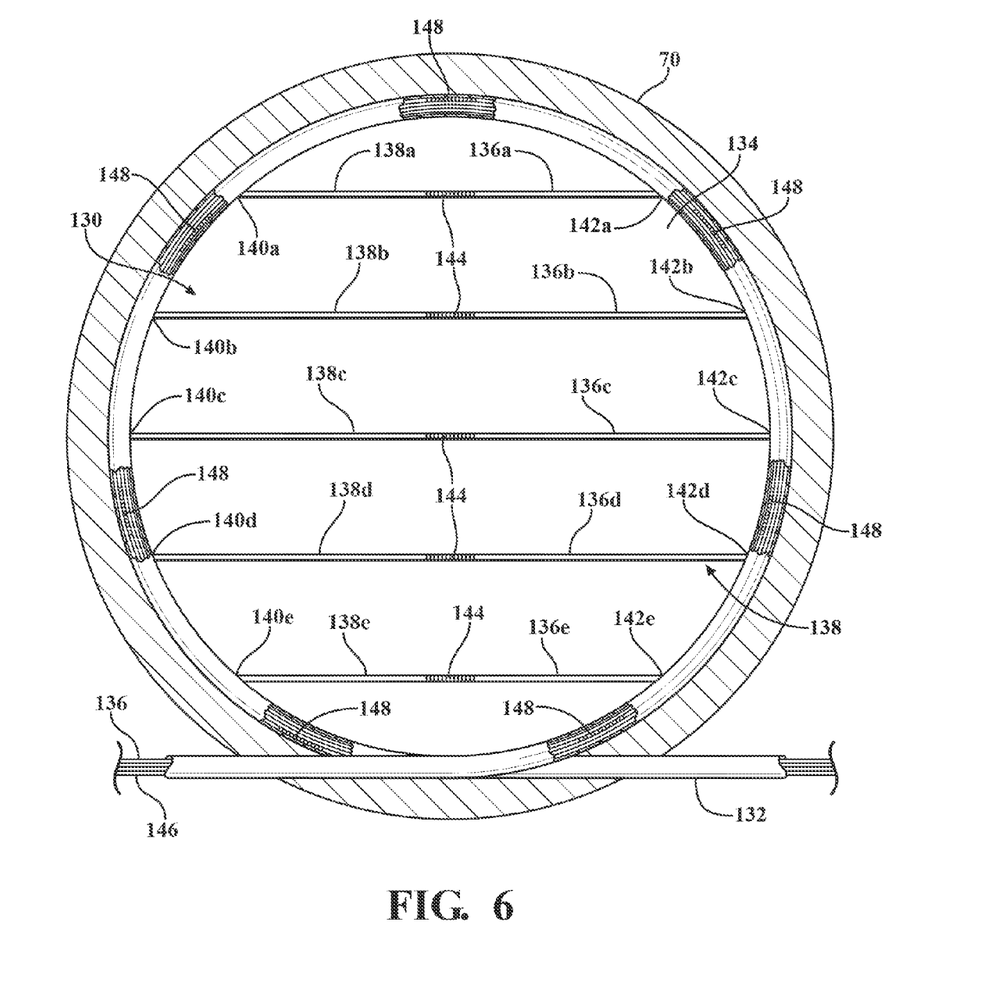
FIG. 6 is an alternative configuration of a detection unit in accordance with the present invention.

Referring to FIG. 6, an alternative configuration for a detection unit is illustrated wherein elements corresponding to the detection unit 30 of the previous embodiment are labeled with the same reference numeral increased by 100. The embodiment of FIG. 6 provides a detection unit 130 that may be used to map a fluid flow across a cross-section of a flow area, such as a cross-section of a circular duct. For example the detection unit 130 may be located in one of the ducts 70 (FIG. 1) extending longitudinally through the generator 10.

The detection unit 130 may include a conduit structure 132 extending around an inner circumference of the duct 70. A first fiber optic conductor 136 and a second fiber optic conductor 146 extend within the conduit structure 132 for obtaining velocity and temperature measurements, respectively. In the present embodiment, the first fiber optic conductor 136 may comprise a plurality of optical fibers 136*a-e*. The first fiber optic conductor 136 defines a plurality of elongated flow measurement portions 138, individually identified as 138*a-e*, extending outside of the conduit structure 132. Each measurement portion 138*a-e* may be formed by a portion of a respective optical fiber 136*a-e* forming the first fiber optic conductor 136. In particular, the individual optical fibers 136*a-e* may extend between respective pairs of a plurality of first locations 140*a-e* and second locations 142*a-e* defined by openings in the conduit structure 132 for passage of the optical fibers 136*a-e* between the interior of the conduit structure 132 and a fluid flow passage 134. The locations 140*a-e* and 142*a-e* define locations supporting generally stationary ends of the respective measurement portions 138*a-e*.

Each measurement portion 138*a-e* may be provided with a FBG 144, which may be located generally centrally of each of the measurement portions 138*a-e*. Each velocity FBG 144 has a grating spacing that corresponds to a unique central Bragg wavelength λ, for reflecting light at a wavelength that is unique to each FBG 144 in the first fiber optic conductor 136. Flow of cooling fluid through the flow passage 134 causes the measurement portions 138*a-e* to flex and create a strain in the fiber optic conductor 136 an amount that is proportional to the flow velocity, and which may be detected at the various locations of the velocity FBGs 144. Variations in flow velocity across the cross-section of the flow space 134 may cause a varying flexing and strain in the velocity FBGs 144 located in the measurement portions 138*a-e* to provide velocity measurements corresponding to the different locations of the velocity FBGs 144. Hence, a velocity profile for the fluid flow through the flow space 134 may be mapped to provide data to evaluate fluid flow in structures such as the duct 70.

The second fiber optic conductor 146 may be provided with a plurality of temperature FBGs 148 to provide temperature measurements that may be used to correct the velocity measurement for temperature variations in a manner similar to that described for the temperature FBGs 48 of the previous embodiment. It should be understood that the present embodiment may include any number of measurement portions 138, and any number of velocity FBGs 144 and temperature FBGs 148 may be provided. In addition, the temperature FBGs 148 may be formed in one or more of the velocity FBGs 144, such that the separate, second fiber optic conductor 146 may not be required for obtaining temperature measurements.

Figure 7:
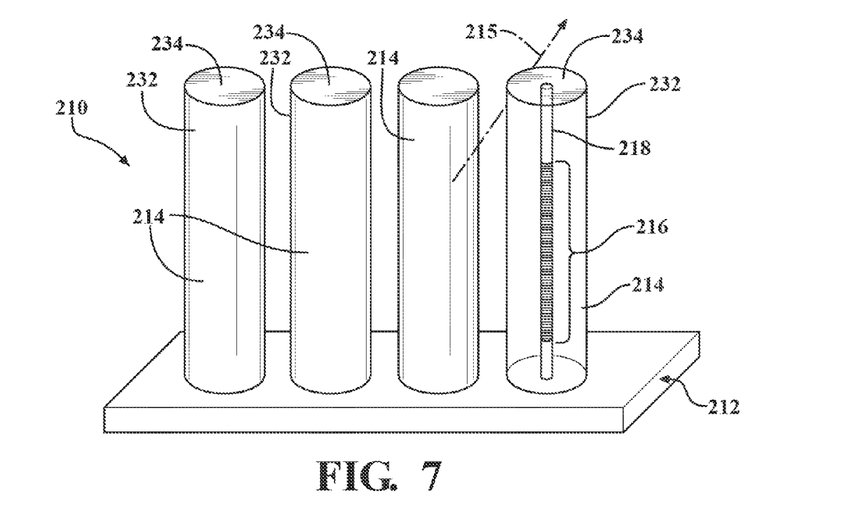
FIG. 7 is a diagrammatic view of a further embodiment of a detection unit of the present invention.

Referring to FIG. 7, a further embodiment of the invention is illustrated including a detection unit 210 that may be mounted in a generator blower outlet duct or in other locations, as described for the previous embodiments. The detection unit 210 comprises a base portion 212 supporting a plurality of optical fibers 214 extending generally perpendicular to the base portion 212 and parallel to each other into or across a fluid flow space. The optical fibers 214 may be arranged in at least one row extending perpendicular to a direction of flow 215 of a cooling fluid flow past the detection unit 210 within the fluid flow space. As is illustrated diagrammatically in one of the optical fibers 214, a long period grating (LPG) 216 may be provided in the core 218 along an elongated or lengthwise extending portion of each of the optical fibers 214.

Figure 8:
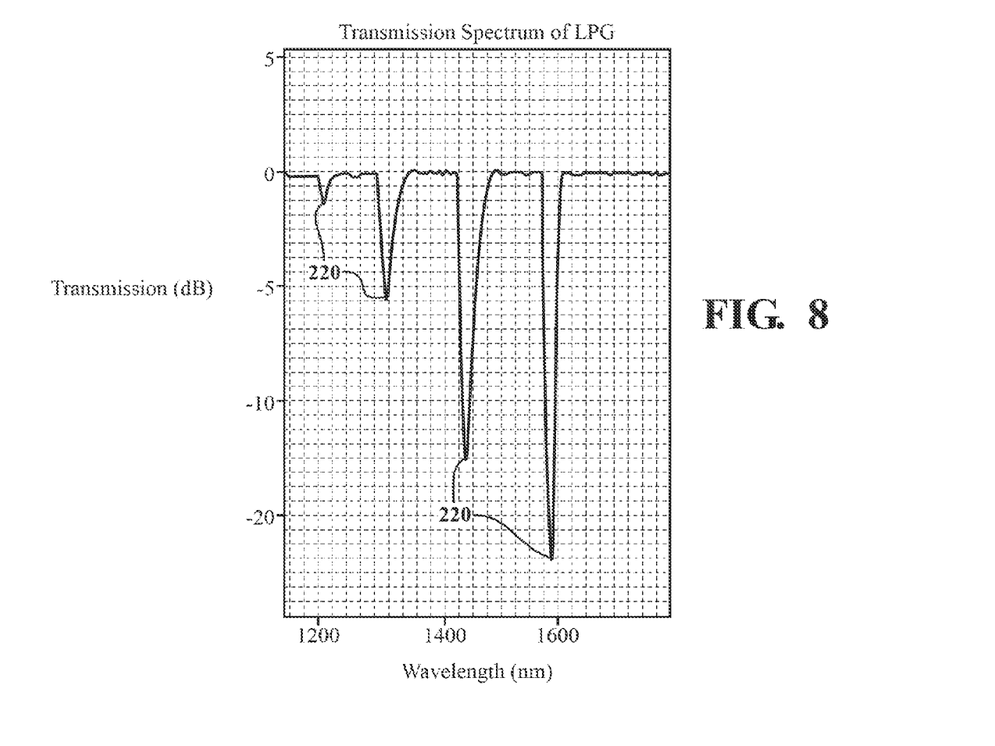
FIG. 8 is a plot illustrating cladding modes that may be provided by the detection unit of FIG. 7.

The LPGs 216 provided to the optical fibers 214 are similar to the FBGs of the previous embodiments in that both have periodic structures in the core of the optical fiber. However, unlike the FBG, the LPG structure is usually 5 to 10 times longer and the grating pitch is longer, giving the LPG a characteristic function of coupling the propagation modes to the cladding modes. Thus, in transmission, the optical signal, after passing the LPG structure, has a series of wavelength "notches". These notches are wavelength bands, in the interrogation signal, that have been removed, i.e., converted to cladding modes. The cladding modes are highly dependent on the bending of the optical fiber 214 with a resulting change in spacing of the gratings forming the LPG 216. Hence, a force that causes the optical fiber to bend will in turn manifest itself in a perturbation of the cladding modes. FIG. 8 illustrates a typical transmission spectrum that may be provided by the cladding modes 220 of the LPG 216. Any bending of the optical fibers 214, and corresponding change of the spacing between the gratings of the LPGs 216, will result in a greater loss of the light passing though the LPGs 216 to the cladding modes. Each of the optical fibers 214 may be provided with an LPG structure 216 having a unique set of cladding modes 220, such that a unique set of cladding mode wavelengths correspond to each location of an optical fiber 214.

Figure 9:
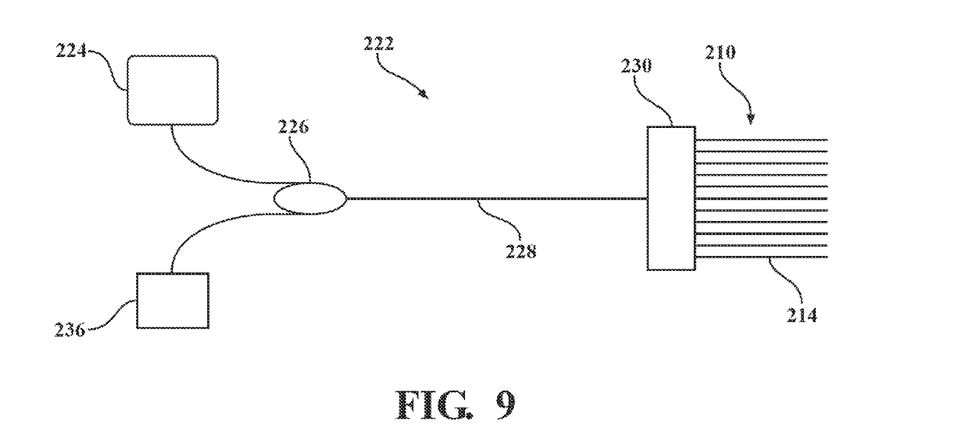
FIG. 9 is a diagrammatic view of a monitoring system incorporating the detection unit of FIG. 8.

Referring to FIG. 9, a monitoring system 222 incorporating the detection unit 210 is illustrated. The monitoring system 222 includes a source of optical radiation 224, such as a broadband light source for supplying light to the optical fibers 214 via a coupler 226, and a supply fiber optic conduit structure 228 extending from the coupler 226 to a splitter 230. The splitter 226 may be provided to the base portion 212 of the detection unit 210 to distribute light conveyed from the optical radiation source 224 to each of the optical fibers 214.

As discussed above, the light passing through the LPGs 216 will exhibit a loss of light in particular wavelength bands to the cladding modes 220. A free end 232 of each of the optical fibers 214 is provided with a reflective surface 234 (FIG. 7) that will reflect the light propagated through the LPG 216 back through the optical fiber 214 to the optical fiber conductor structure 228 via the splitter 230. The reflected light from the optical fibers 214 is then received via the coupler 226 at an optical processor or analyzer 236 where a determination of the cladding mode losses may be performed to determine an amount of bending of each of the optical fibers 214, corresponding or proportional to a velocity of the cooling fluid flow past each optical fiber 214 in the detection unit 210.

The sensitivity or responsiveness of the detection unit 210 may be altered or adjusted by changing physical characteristic of the optical fibers 214, such as by changing the diameter and/or length of the optical fibers 214. That is, by providing a thinner or longer optical fiber 214, the resistance of the optical fibers 214 to bending may be decreased, such as may be desirable in an application having a lower velocity flow.

In addition, a fiber optic conductor having temperature FBGs (not shown) may be provided associated with the optical fibers 214, such as in the base portion 212 of the detection unit 210, to provide a temperature measurement and/or to provide a temperature correction for the velocity measurement obtained from the optical fibers 214, as described for the embodiment of FIGS. 2-4.

Figure 10:
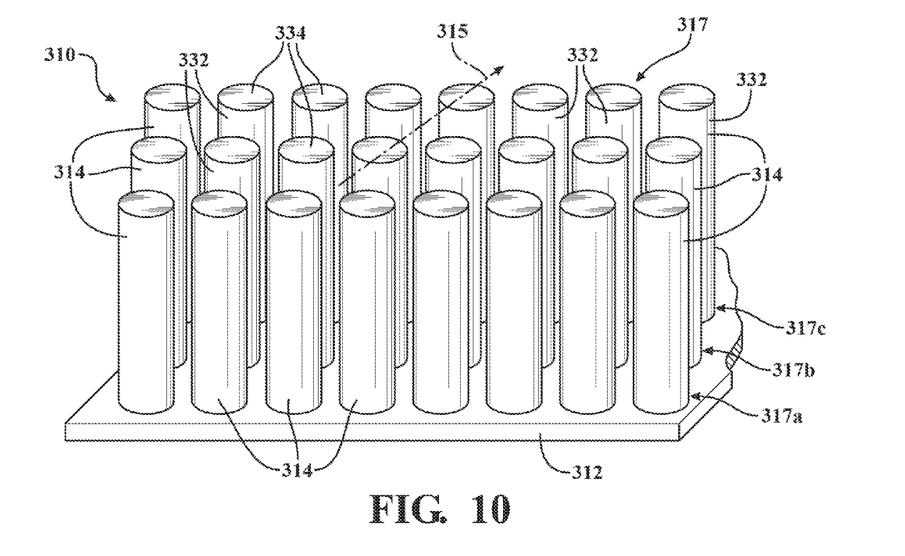
FIG. 10 is a further embodiment of a detection unit in accordance with the present invention.

Referring to FIG. 10, an alternative embodiment of the embodiment of FIG. 7 is illustrated, in which elements of the embodiment of FIG. 10 corresponding to the embodiment of FIG. 7 are labeled with the same reference numeral increased by 100.

FIG. 10 illustrates a detection unit 310 including a plurality of optical fibers 314 arranged in an array 317 on a base portion 312 and comprising multiple rows of the optical fibers 314, illustrated herein as rows 317a, 317b, 317c extending transverse to a direction of fluid flow 315, and including free ends 332 that are generally freely movable in the fluid flow. The optical fibers 314 each include LPGs and a reflective end surface 334, and operate in the same manner as described for the optical fibers 214 of the embodiment of FIG. 7. Further, the optical signals from the multiple rows of optical fibers 314 may be processed to determine a direction of fluid flow. For example, a direction transverse to a direction parallel to a predetermined fluid flow path through a duct, or a curvature to the fluid flow may be detected by comparing or mapping the differential bending of adjacent and/or successive optical fibers 314 to determine the relative strength of current flow across portions of the detection unit 310, which current flow may extend at angles relative to a direction perpendicular to the extent of the rows of the array 317, as is depicted by the angled flow line 315.

From the above description of the invention, it should be apparent that embodiments of the invention provide a method and system capable of obtaining multiple and simultaneous velocity and temperature measurements that may be distributed through a fluid flow space. Further, the configuration of the measurement system provides a degree of flexibility that permits it to be located within and along complex structures to provide fluid flow and temperature measurements at locations that may not be accessible by conventional sensing devices.

It may also be noted that the use of fiber optic conductors as the sensing elements of the system described herein provides a sensor that may have a higher level of acceptance in monitoring electrical generating equipment. The relatively small and light weight optical fibers generally present a reduced risk of causing damage within the electrical generating equipment if the optical fibers should become damaged and/or enter the cooling fluid flow for the equipment.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring velocity of a fluid flow through a predetermined fluid flow space formed by a wall defining and extending in a fluid flow direction, the method comprising:

supporting a fiber optic conductor on the wall, the fiber optic conductor having a flow measurement portion defining an elongated dimension extending across a portion of the fluid flow space and the elongated dimension extending transverse to the fluid flow direction for flexing in response to fluid flow against the flow measurement portion, the flow measurement portion including a Bragg grating having a characteristic optical wavelength;

the fluid flow in the fluid flow space causing the measurement portion of the fiber optic conductor to flex in a direction transverse to the elongated dimension;

supplying optical radiation to the fiber optic conductor, and the Bragg grating interacting with the supplied optical radiation;

receiving optical radiation from the fiber optic conductor after the supplied optical radiation has passed through at least a portion of the measurement portion and has interacted with the supplied optical radiation; and analyzing the received optical radiation to produce a determination of a flow velocity of the fluid flow;

wherein the fiber optic conductor extends within a hollow elongate conduit structure, the hollow conduit structure extending into the flow space from a location on the wall and back to the location on the wall in a generally circular loop, the generally circular loop defining a plane that extends transverse to the fluid flow direction, and the fluid flow passes through the loop transverse to the plane defined by the loop, the fluid flow causing the measurement portion of the fiber optic conductor to flex in the direction transverse to the plane defined by the loop, between a pair of locations on the loop where the fiber optic conductor extends outside of the conduit structure.

2. The method of claim 1, wherein a strain produced within the measurement portion of the fiber optic conductor produces a reflected wavelength, and a change in the received optical radiation results from a shift in wavelength from the characteristic wavelength corresponding to a flow velocity at the measurement portion.

3. The method of claim 2, wherein the fiber optic conductor includes a plurality of Bragg gratings, each Bragg grating defining a flow measurement portion comprising a unique characteristic wavelength, and including obtaining a flow velocity measurement corresponding to the location of each Bragg grating.

4. The method of claim 1, wherein the fiber optic conductor includes a plurality of measurement portions traversing between respective pairs of locations on the loop, each measurement portion including one or more of the Bragg gratings and providing flow velocity measurements at different locations along the fiber optic conductor.

5. The method of claim 1, including a second fiber optic conductor including one or more Bragg gratings and enclosed within the conduit structure and located adjacent to the fiber optic conductor having the flow measurement portion, and including:

supplying optical radiation to the second fiber optic conductor;

receiving optical radiation from the second fiber optic conductor; and determining a shift in wavelength from a characteristic wavelength to produce a determination of a temperature at the locations of the one or more Bragg gratings of the second fiber optic conductor.

6. The method of claim 5, including adjusting the determination of the flow velocity with reference to the determination of the temperature.

7. A system for monitoring velocity of a fluid flow through a predetermined fluid flow space formed by a wall defining and extending in a fluid flow direction, the system comprising:

a conduit structure comprising a hollow elongate member extending in a generally circular loop supported on the wall to define a generally circular passage, the hollow conduit structure extending from a location on the wall and back to the location on the wall to form the generally circular loop, the generally circular loop defining a plane that extends transverse to the fluid flow direction;

a fiber optic conductor extending within the conduit structure, the fiber optic conductor defining a flow measurement portion including a Bragg grating extending outside of the conduit structure, from a first opening to a second opening in the conduit structure, across a portion of the fluid flow space within the generally circular passage defined by the loop, and the flow measurement portion defining an elongated dimension extending transverse to the fluid flow direction for flexing in response to fluid flow against the flow measurement portion;

an optical radiation source supplying optical radiation to the fiber optic conductor;

a processing unit adapted to receive and analyze optical radiation from the fiber optic conductor after the supplied optical radiation has passed through the measurement portion to produce a determination of a flow velocity of the fluid flow.

8. The system of claim 7, including a second fiber optic conductor connected to the optical radiation source and the processing unit and extending within the conduit structure adjacent to the fiber optic conductor having the flow measurement portion, the second fiber optic conductor being fully contained within the conduit structure and including one or more Bragg gratings adapted to provide a temperature measurement at locations of the one or more Bragg gratings.

9. The system of claim 7, wherein the conduit structure defines a plurality of generally circular loops, each of the loops comprising one or more measurement portions.

* * * * *